United States Patent
Schiffers et al.

(10) Patent No.: US 8,511,166 B2
(45) Date of Patent: Aug. 20, 2013

(54) STRAIN MEASUREMENT OF ROTATING COMPONENTS

(75) Inventors: Werner Schiffers, Ashby-de-la-Zouch (GB); John R. Webster, Derby (GB)

(73) Assignee: Rolls-Royce PLC, London (GB)

( * ) Notice: Subject to any disclaimer, the term of this patent is extended or adjusted under 35 U.S.C. 154(b) by 66 days.

(21) Appl. No.: 13/128,468

(22) PCT Filed: Oct. 28, 2009

(86) PCT No.: PCT/EP2009/007720
§ 371 (c)(1),
(2), (4) Date: May 10, 2011

(87) PCT Pub. No.: WO2010/060519
PCT Pub. Date: Jun. 3, 2010

(65) Prior Publication Data
US 2011/0232395 A1    Sep. 29, 2011

(30) Foreign Application Priority Data
Nov. 26, 2008    (GB) .................................. 0821592.3

(51) Int. Cl.
*G01D 9/00*    (2006.01)
*G01L 3/00*    (2006.01)
(52) U.S. Cl.
USPC ........................................ 73/650; 73/862.325
(58) Field of Classification Search
USPC .................. 73/597, 599, 602, 627, 649, 655, 73/658, 650, 862.331–862.336, 862.325
See application file for complete search history.

(56) References Cited

U.S. PATENT DOCUMENTS

| 4,008,600 A | | 2/1977 | Bremer, Jr. et al. |
| 4,379,226 A | * | 4/1983 | Sichling et al. ............ 250/231.1 |
| 4,481,825 A | * | 11/1984 | Kljuev et al. .................. 73/655 |
| 5,585,572 A | * | 12/1996 | Kindler ...................... 73/862.338 |
| 6,415,666 B1 | * | 7/2002 | Donskoy et al. ................ 73/627 |
| 6,492,933 B1 | * | 12/2002 | McEwan .......................... 342/28 |
| 6,505,130 B1 | * | 1/2003 | Springer et al. ................ 702/40 |
| 6,545,762 B2 | * | 4/2003 | Lewis et al. .................... 356/502 |
| 7,073,384 B1 | * | 7/2006 | Donskoy et al. ................ 73/657 |
| 7,302,852 B2 | * | 12/2007 | Chien ............................. 73/643 |
| 2004/0017299 A1 | * | 1/2004 | Campbell et al. ........ 340/870.01 |
| 2009/0320609 A1 | * | 12/2009 | Xia et al. ................... 73/862.08 |
| 2010/0319457 A1 | * | 12/2010 | Tyren .............................. 73/649 |

FOREIGN PATENT DOCUMENTS

WO    WO 01/73389 A1    10/2001

OTHER PUBLICATIONS

Vibstring TorqueSensor; accessed Mar. 3, 2009; http://www.vibstring.com/torque.php.
International Search Report dated May 31, 2010 in corresponding International Application No. PCT/EP2009/007720.
Written Opinion of the International Searching Authority dated May 31, 2010 in corresponding International Application No. PCT/EP2009/007720.
British Search Report dated Mar. 3, 2009 in corresponding British Application No. 0821592.3.

* cited by examiner

*Primary Examiner* — Lisa Caputo
*Assistant Examiner* — Jonathan Dunlap
(74) *Attorney, Agent, or Firm* — Oliff & Berridge, PLC

(57) ABSTRACT

A strain sensor apparatus for a rotatable shaft including an emitter/receiver, a vibration element attached to the shaft and arranged for receiving and reflecting signals to and from the emitter/receiver wherein the vibration element includes asymmetric stiffness properties between a radial and axial and/or circumferential directions relative to a rotational axis of the shaft.

9 Claims, 3 Drawing Sheets

STRAIN MEASUREMENT OF ROTATING COMPONENTS

The present invention relates to a method and apparatus associated with wireless flexural behaviour measurement and in particular, but not exclusively, steady and/or vibrational strain and torque measurement of a shaft of a gas turbine engine for example.

Conventional wireless sensors find a wide range of applications in the field of instrumentation for example in engine development work, processing plants and medicine to name but a few. Wireless sensors have shown a clear potential in particular for vibration and rotational monitoring. When applied for instrumentation on development gas turbine engines, wireless sensors have a number of advantages such as the reduction of expensive wiring, the reduction of complexity, reduced set up time for monitoring and removal of connector faults.

One application of wireless sensors is the measurement of torque on a rotating shaft. The majority of torque sensors employ strain gauges and use slip rings, inductive or optical links to transfer data.

A further torque sensor apparatus 30, as shown on FIG. 1, comprises an emitter/transceiver 32 directed towards a shaft 34 having a metal wire 36 attached thereto. The metal wire is attached between two points on the shaft at an angle to its rotational axis 38. If no torque is applied to the shaft, common operational vibrations in the shaft excite the wire and make it vibrate at its resonance frequency $f_0$, which is determined by wire's geometrical and material parameters. Application of torque to the shaft alters the wire tension, resulting in a corresponding change of the resonance frequency. A microwave transceiver, directed towards the 'sensing' wire, emits an RF signal which is reflected by the wire. The return signal is amplitude modulated due to the wire vibrations.

However, this torque sensor is disadvantaged in that the omni-directional vibration and omni-directional wave scattering of the aforementioned string which will reduce the signal strength back to the transceiver. The resonant frequency is dependent upon the tension in the wire. Strain is the measure and materials moves the ends apart which increases strain hence increasing the resonant frequency which is detected as a measure of the strain. Centrifugal loading causes the wire to bend radially outward, which also increases the tension in the wire and so causes an additional change in frequency which can cause confusion in the measurement of strain or at least the wire-system will require calibrating. Furthermore, strain hysteresis in the wire can also cause its natural frequency to alter throughout its life cycle, thereby requiring frequent calibration or causing erroneous results.

Therefore it is an object of the present invention to provide new torque sensor apparatus and method of measuring torque which obviates the above mentioned problems.

In accordance with the present invention there is provided a strain sensor apparatus for a rotatable shaft comprising an emitter/receiver, a vibration element attached to the shaft and arranged for receiving and reflecting signals to and from the emitter/receiver characterised in that the vibration element comprises asymmetric stiffness properties between a radial and axial and/or circumferential directions relative to a rotational axis of the shaft.

Preferably, the vibration element is a plate, but may be any one of an L-, T- H- or I-section.

The vibration element may be hollow or corrugated.

Preferably, the plate comprises an aspect ratio, between a reflective surface and another surface, greater than 1.

Advantageously, the plate comprises an aspect ratio, between a reflective surface and another surface, approximately 20.

Preferably, the reflective surface is approximately parallel to a radial direction relative a rotational axis of the shaft.

Preferably, the emitter/receiver uses any one of microwaves, electromagnetic waves, optical radiation or acoustic energy.

Preferably, the vibration element is attached to its lateral edges.

Possibly, the vibration element is attached to an axial and/or circumferential edge.

The present invention will be more fully described by way of example with reference to the accompanying drawings in which.

Figure 1:
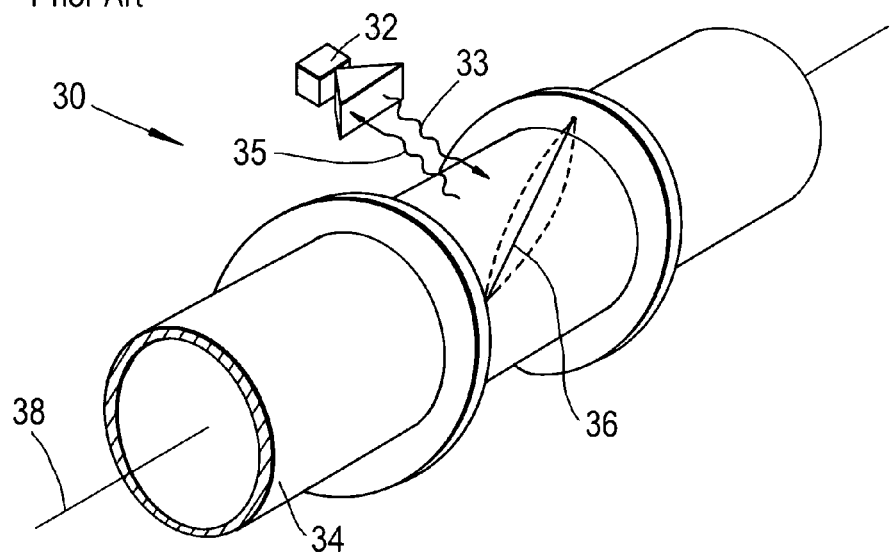
FIG. 1 is a schematic view of a prior art torque sensor apparatus applied to a shaft.
Figure 2:
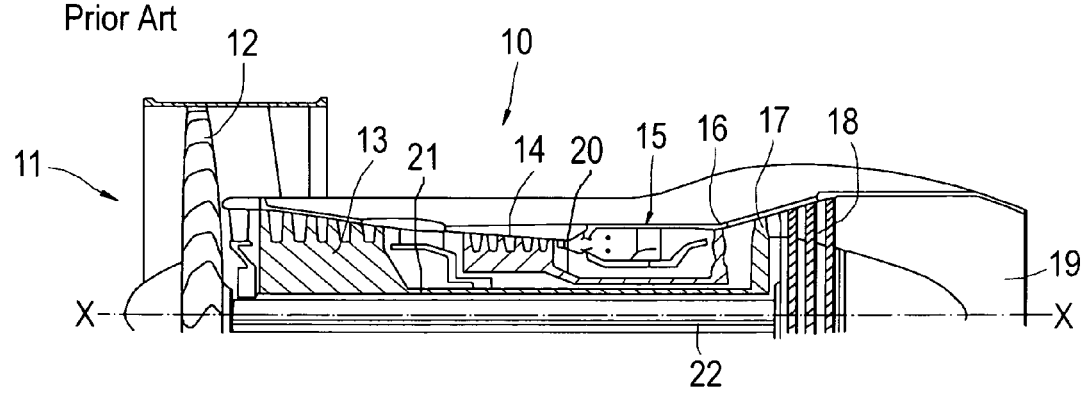
FIG. 2 is a schematic section of a prior art three-shaft ducted fan gas turbine engine.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19.

The gas turbine engine 10 works in a conventional manner so that air entering the intake 11 is accelerated by the fan 12 to produce two air flows: a first air flow into the intermediate pressure compressor 14 and a second air flow which passes through a bypass duct (not shown) to provide propulsive thrust. The intermediate pressure compressor 13 compresses the air flow directed into it before delivering that air to the high pressure compressor 14 where further compression takes place. The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by interconnecting shafts 20, 21, 22 respectively thereby making up high, intermediate and low-pressure spools.

Figure 3:
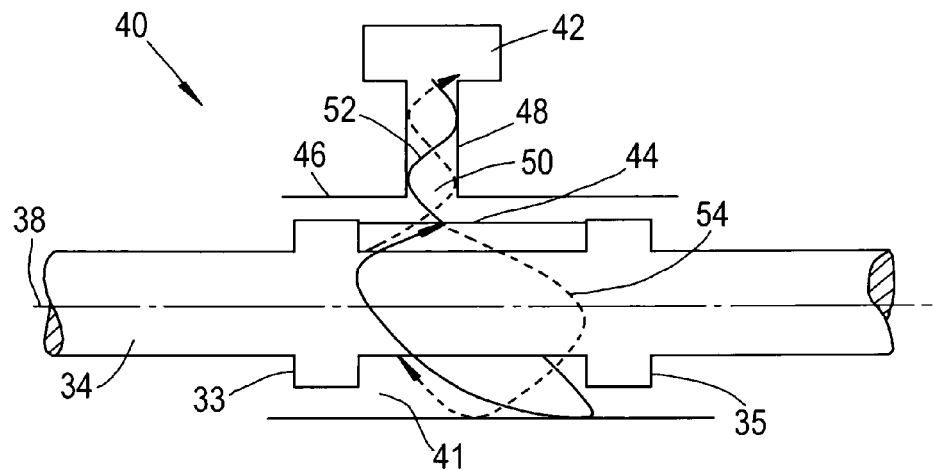
FIG. 3 is a schematic side view of strain sensor apparatus applied to a shaft in accordance with the present invention.
Figure 4:
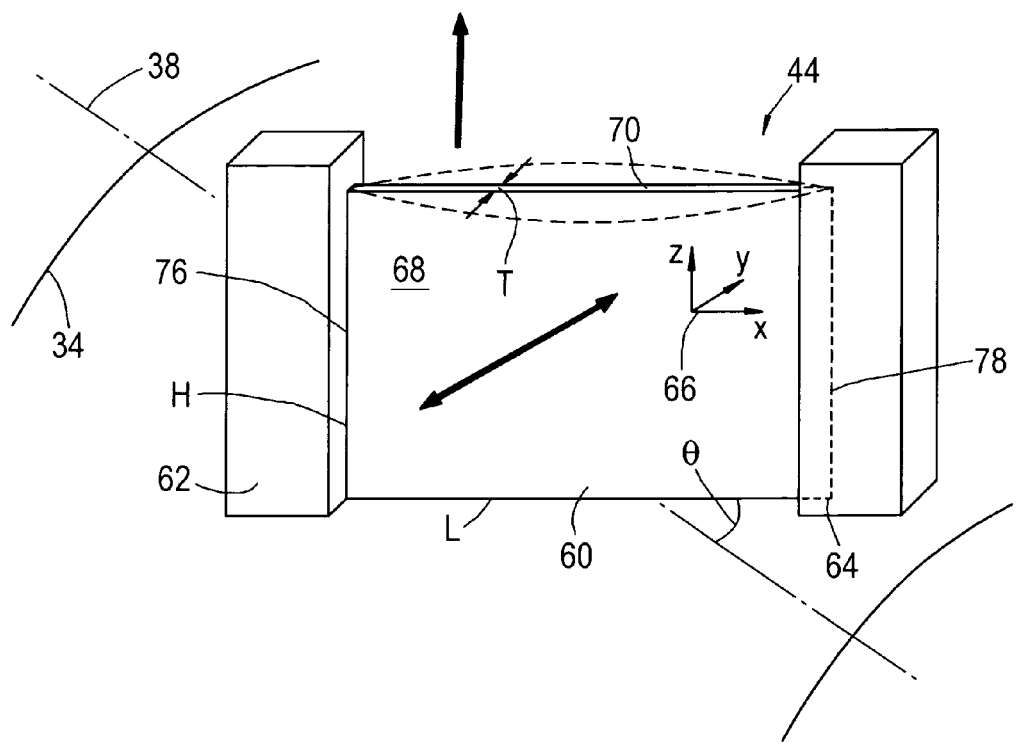
FIG. 4 is a schematic layout of an embodiment of the strain sensor apparatus in accordance with the present invention.

Referring to FIGS. 3 and 4, a novel strain sensor apparatus 40 comprises an emitter/transceiver 42 directed to a vibration element 44, in accordance with the present invention, attached to a shaft 34. An annulus 46 surrounds the shaft 34 radially outwardly of the vibration element 44. A waveguide 48 extends between the emitter/transceiver 42 and an aperture 50 defined in the annulus 46.

This strain sensor apparatus 40 is generally configured and functions very similarly to the Applicant's co-pending GB application filed on the same day as this and having Applicant's internal reference number DY4212. Therefore the teachings of the Applicant's co-pending application are incorporated by reference herein and only differences therefrom are described herein.

The present invention is directed to the configuration of the vibration element 44, which is shown in more detail on FIG. 4. The vibration element 44 comprises a flat plate 60 mounted between two supports 62, 64, via its lateral edges 76, 78, that are connected to the shaft 34. The structure of these supports is largely coincidental and it will be appreciated that many other arrangements are possible and such design details as fillet radii and stiffness are changeable dependent on application. A set of axes 66 refers to the plate 60. The plate 60 has a length L, height H and thickness T and its principle surface 68, defined by L and H is in the XZ plane. Preferably and as shown in this example, Z is in the radial direction relative to the rotational axis of the shaft 38. The plate 60 comprises a 'high-aspect' ratio which is defined as the ratio of the area of surface 68 to the area of a surface 70. The surface 68 is preferably parallel to the radial direction relative the rotational axis 38. Effectively, as L will be the same for each surface 68, 70 in most cases, the term high-aspect ratio can also be thought of as H/T.

The prior art vibration wire is generally circular in cross-section and therefore has an aspect ratio of 1:1 or commonly referred to as an aspect ratio of 1 (i.e. 1/1). The vibration plate 60 of the present invention is differentiated by its aspect ratio being greater than 1. The Applicant has believes that for a shaft of a gas turbine engine an aspect ratio of 10 provides a significant improvement and that an aspect ratio of 20 is particularly useful.

The vibration plate of the present invention seeks to improve the return radiation signal strength and the plate's tolerance to centrifugal effects caused by rotation of the shaft. The plate 60 is arranged such that the vibration mode of interest, for example, in the Y-direction, is substantially perpendicular to the centrifugal force, which is in the Z direction. Note that the Y-direction is not circumferentially aligned in this case, but may be if desired. In fact, in this example the plate is orientated at an angle θ=45°. This angle is particularly suited to torsional vibrations wherein the torsional forces act on the shaft at 45° to the axis 38 in a circumferential manner.

Because of the plate's section depth, Z-direction dimension, it is particularly stiff and capable of resisting the centrifugal force. However, in the Y-direction, in this case the direction of maximum amplitude of the torsional vibration, the plate is relatively flexible and therefore produces a significantly better return radiation signal. In short, the plate of the present invention allows a much greater sensitivity to strain and/or allows operation at higher rotational speeds. Thus the present invention provide a unidirectional vibrating plate that produces a superior return signal than the prior art vibrational wire that vibrates in the Z-direction that disadvantageously interferes with the sensed vibration return signal.

The frequency of vibration in the y-direction is used to indicate strain. As the distance between the supports 62, 64 changes, this changes the tension in the plate in the x-direction. This in turn will change the resonant frequency for vibrational movement in the y- and z-directions. The component is deigned such that a mode or modes in the y-direction (typically the fundamental mode with just one anti-node along the x-direction) is used to measure the strain between supports 62 and 64. Since the plate is stiff in the z-direction, any centrifugal force will have minimal effect on vibrations in the y-direction.

The dimensions and frequencies will be chosen at the design stage to suit particular applications, but typical values for the fundamental resonance in the y-direction are 5 kHz.

Figure 5:
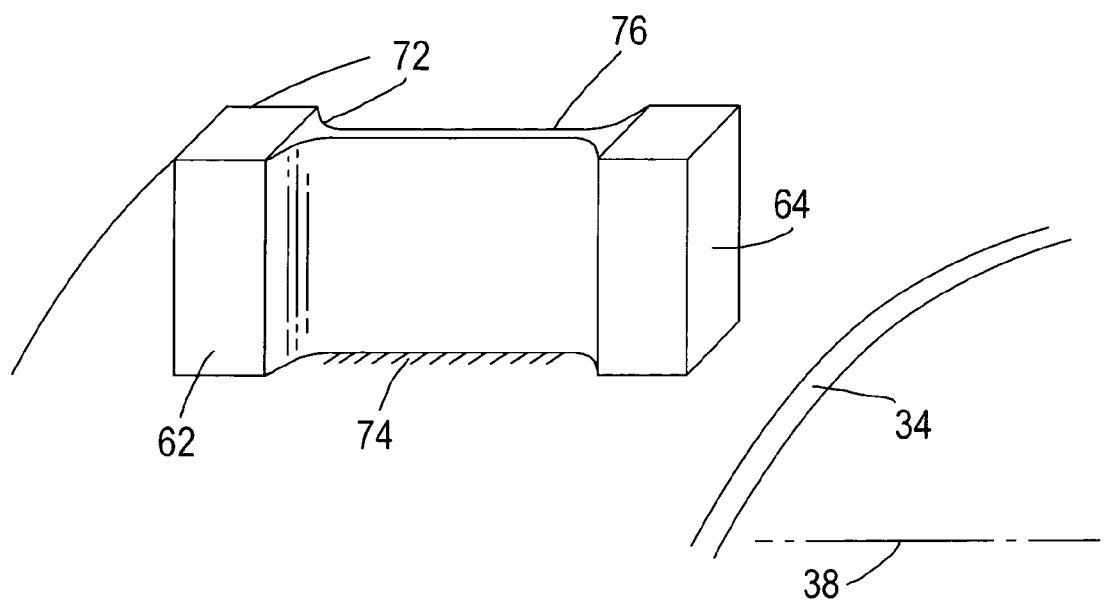
FIG. 5 is a schematic layout of another embodiment of the strain sensor apparatus in accordance with the present invention.

Referring to FIG. 5, although described hereinbefore as a plate 70, any structure or geometry having asymmetrical stiffness and appropriate vibration modes or frequencies can be used and may be hollow, corrugated, L-, T- H- or I-sections. The plate 70 may also be attached to the shaft or other measured structure along an axially and/or circumferentially extending edge 74. It will also be noted that in common with good vibration practice, a non-uniform cross-section plate with stress reducing features, such as fillet radii 72, may be advantageous.

The invention claimed is:

1. A strain sensor apparatus for a rotatable shaft,
   the strain sensor apparatus comprising an emitter/receiver,
   a vibration element attached to the shaft,
   the vibration element is arranged for receiving and reflecting signals to and from the emitter/receiver,
   the vibration element comprises asymmetric stiffness properties between a radial and axial and/or circumferential directions relative to a rotational axis of the shaft.

2. A strain sensor apparatus as claimed in claim 1 wherein the vibration element is any one of the group comprising a plate, an L-, T- H- or I-section.

3. A strain sensor apparatus as claimed in claim 1 wherein the vibration element is hollow or corrugated.

4. A strain sensor apparatus as claimed in claim 1 wherein the plate comprises an aspect ratio, between a reflective surface and another surface, greater than 1.

5. A strain sensor apparatus as claimed in claim 4 wherein the reflective surface is approximately parallel to a radial direction relative a rotational axis of the shaft.

6. A strain sensor apparatus as claimed in claim 1 wherein the plate comprises an aspect ratio, between a reflective surface and another surface, approximately 20.

7. A strain sensor apparatus as claimed in claim 1 wherein the emitter/receiver uses any one of microwaves, electromagnetic waves, optical radiation or acoustic energy.

8. A strain sensor apparatus as claimed in claim 1 wherein the vibration element is attached at its lateral edges.

9. A strain sensor apparatus as claimed in claim 1 wherein the vibration element is attached at its axial and/or circumferential edge.

* * * * *